E. E. VROOMAN.
CONVEYER.
APPLICATION FILED JUNE 6, 1903.

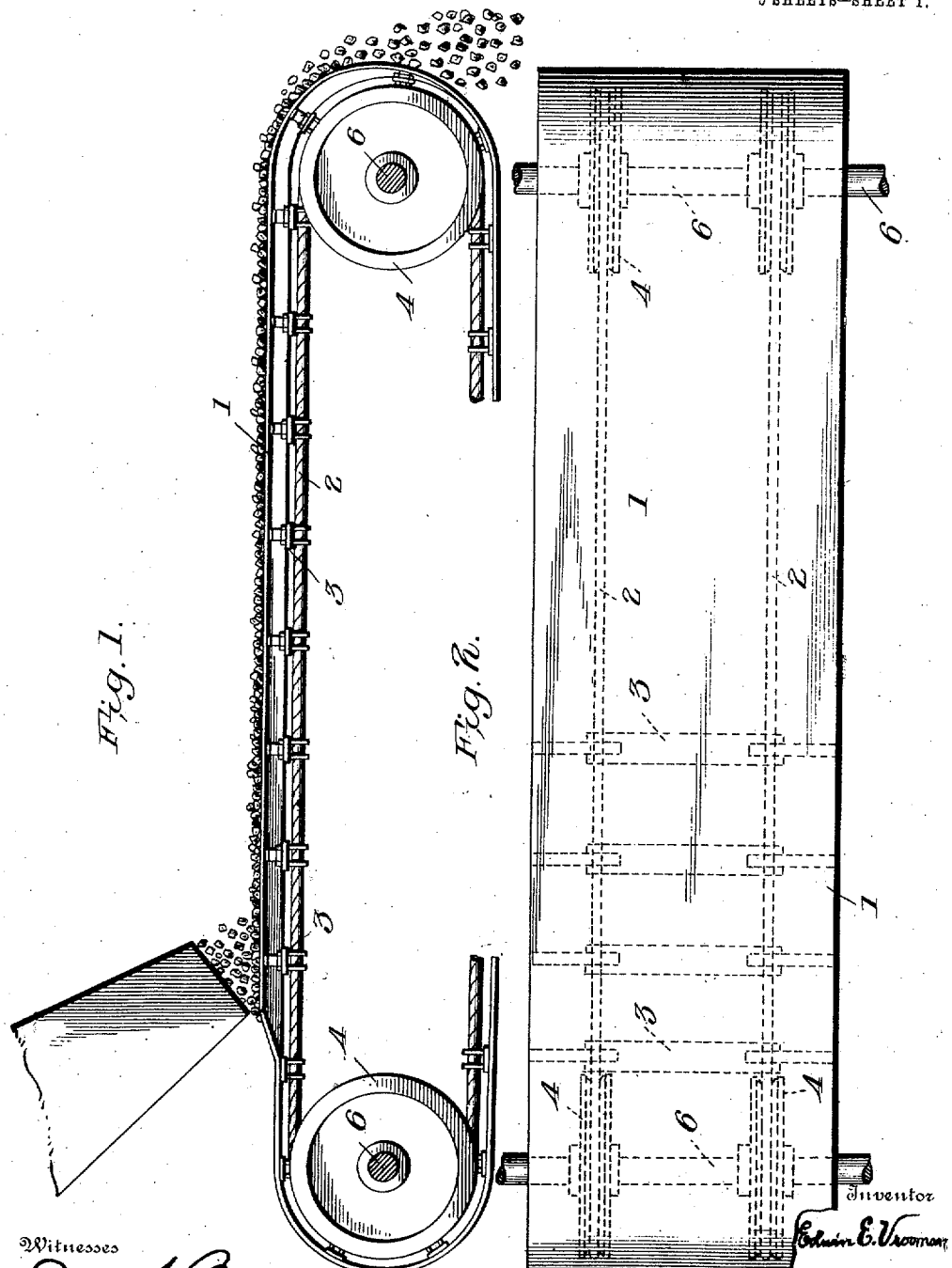

968,211.

Patented Aug. 23, 1910.
5 SHEETS—SHEET 2.

Witnesses
Geo. H. Byrne.
Edgar M. Kitchin

Inventor
Edwin E. Vrooman.

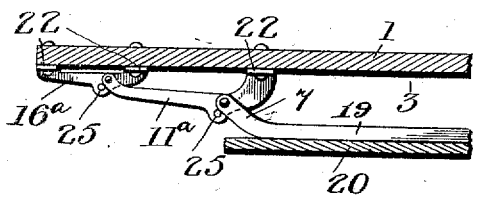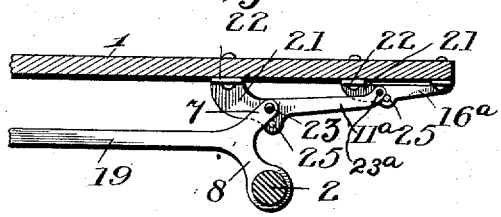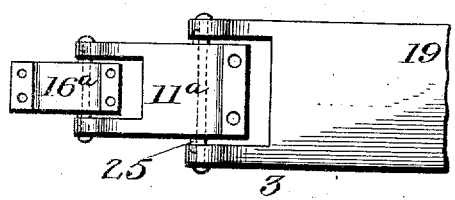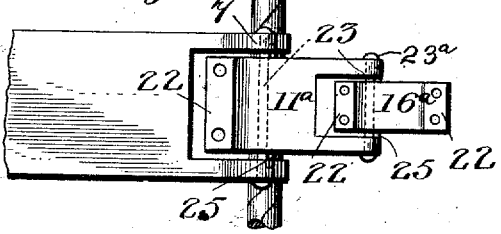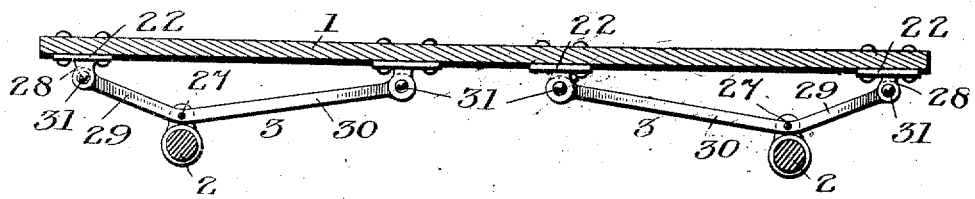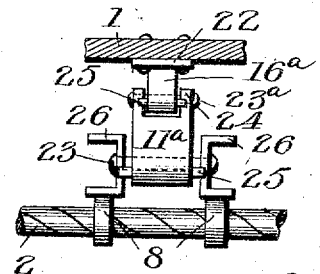

E. E. VROOMAN.
CONVEYER.
APPLICATION FILED JUNE 6, 1903.

968,211.

Patented Aug. 23, 1910.
5 SHEETS—SHEET 4.

Witnesses
Geo. H. Bupue
Edgar M. Kitchin

Inventor
Edwin E. Vrooman

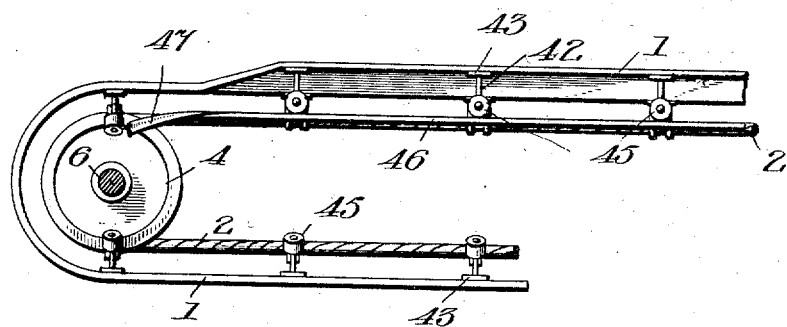
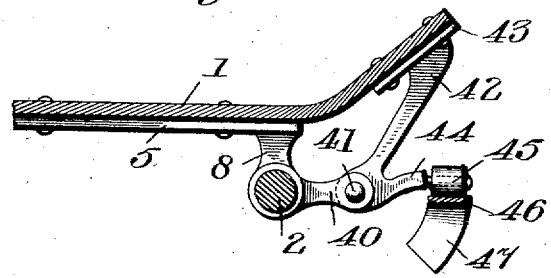
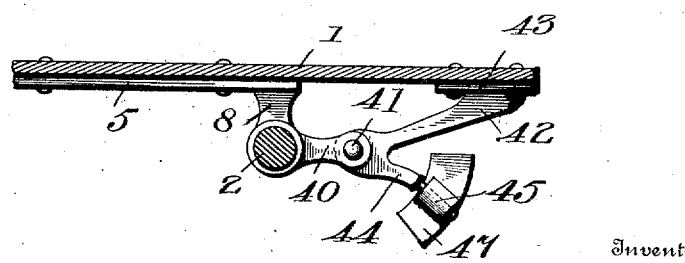

UNITED STATES PATENT OFFICE.

EDWIN E. VROOMAN, OF HYATTSVILLE, MARYLAND.

CONVEYER.

968,211.  Specification of Letters Patent.  Patented Aug. 23, 1910.

Application filed June 6, 1903. Serial No. 160,387.

*To all whom it may concern:*

Be it known that I, EDWIN E. VROOMAN, a citizen of the United States, residing at Hyattsville, in the county of Prince George and State of Maryland, have invented certain new and useful Improvements in Conveyers; and I do hereby declare the following to be a full, clear, and exact description of the invention, such as will enable others skilled in the art to which it appertains to make and use the same.

This invention relates to improvements in conveyers.

One of the numerous objects of the invention is the uniformly, longitudinally troughing of a carrying-surface for a portion of its travel by the provision of a traveling, supporting belt or carriers, surrounded by a main conveying-belt or carrying-surface, and belt troughing means carried by said supporting belt in position for being engaged by said carrying-surface.

Another object of this invention is the provision of means for facilitating the conveying of a load, between end supports only, without any intermediate structure, as for instance between two warehouses, which are separated, more or less, by intervening space.

A further object is the production of a normally flat carrying-surface, and means traveling therewith and actuated by a load for troughing said carrying-surface.

A still further object is the production of a conveyer, comprising traveling supporting means, and means carried by said supporting means and operable by a load for retaining said load.

Another object is to provide means movable with a load-carrying belt for troughing the same, whether said belt is on a horizontal or an inclined plane, and to permit said belt to untrough when the material, or load, is removed therefrom.

I have only stated a few of the many objects of my invention, as the structures are susceptible of many applications.

The invention comprises certain novel constructions, combinations, and arrangements of parts, as will be hereinafter described and claimed.

Figure 3:
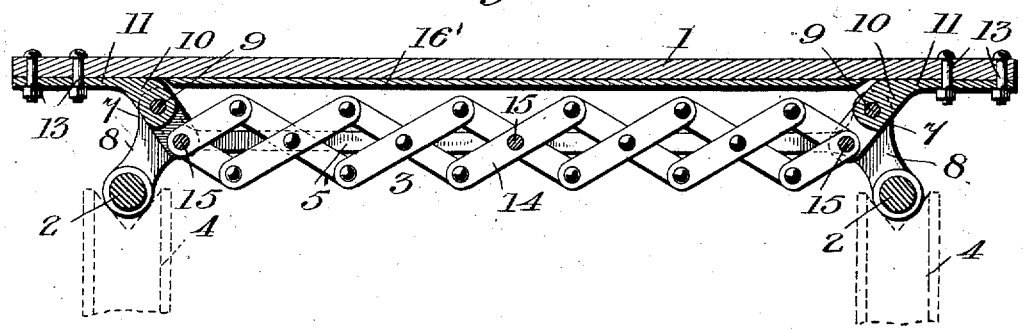
Figure 4:
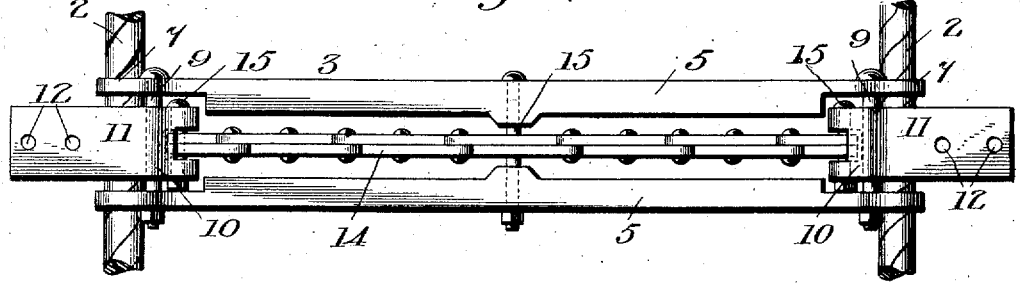
Figure 5:
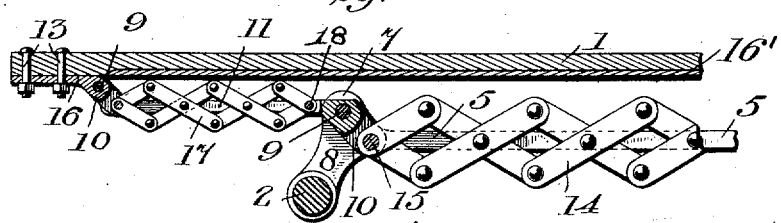
Figure 6:
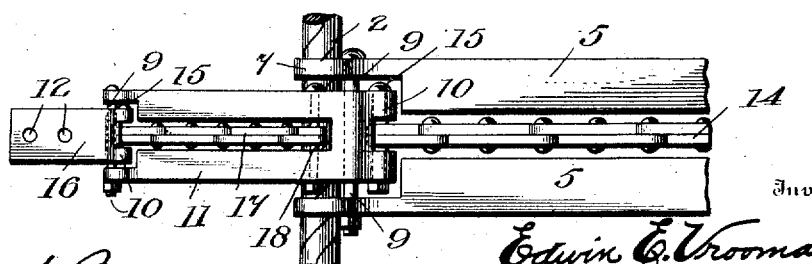
Figure 11:
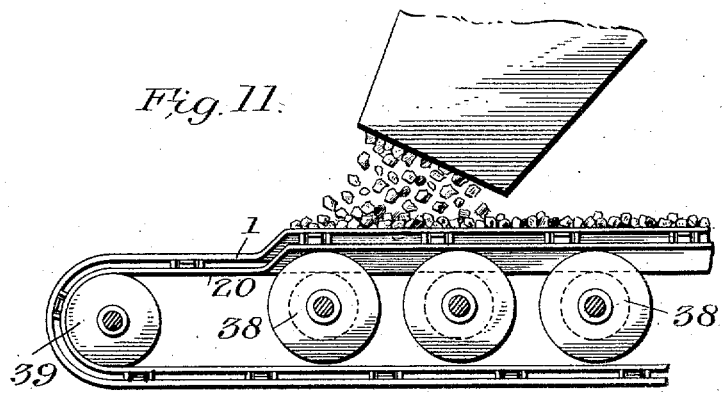
Figure 12:
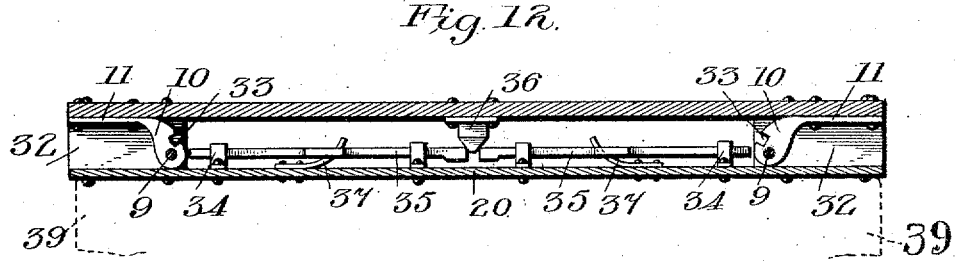
Figure 13:
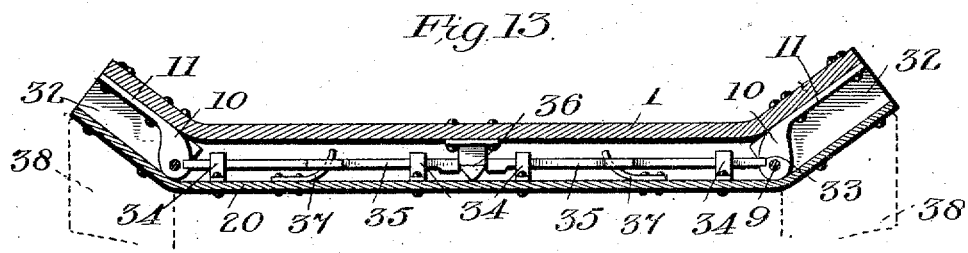
Figure 14:
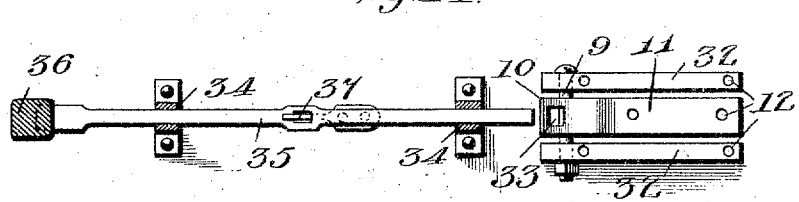

In the drawings: Figure 1 indicates a view in side elevation, partly shown in section, of a conveyer formed in accordance with the general idea of my invention. Fig. 2 is a plan view of the structure shown in Fig. 1, showing parts in dotted lines. Fig. 3 is a view, partly in section, of an embodiment of my invention, showing one of the cleats or troughing devices and the supporting means therefor. Fig. 4 is a plan view of the embodiment shown in Fig. 3. Fig. 5 is a fragmentary view, partly in section, showing movable wings or devices carried by the cupping or troughing members, which assist in curving or turning the edges of the load-carrying-surface at different places on each side; and Fig. 6 is a plan view of this embodiment. Fig. 7 is a sectional view of a two-belt conveyer; while Fig. 8 is a plan view of the trough-shaped members employed in constructing the two-belt conveyer. Figs. 7$^a$ and 8$^a$ are views similar to Figs. 7 and 8 of another embodiment of my invention. Fig. 9 is an embodiment of my invention showing movable troughing members or levers secured to traveling supporting means constituting beltings or carriers, and showing the main belt or carrying-surface connected to the troughing members. Fig. 10 is a fragmentary view, in side elevation of the main belt and supporting carrier or belting, and showing an end view of another embodiment of the troughing devices. Fig. 11 is a fragmentary view, in side elevation, of another embodiment of my two-belt conveyer. Fig. 12 is a transverse, sectional view of the embodiment shown in Fig. 11, in which there is employed a main and a supporting belt; troughing means is interposed between the supporting and main belts for permitting of the main belt to be sustained in a troughed position; and Fig. 13 is a similar view, showing the same in a troughed or cupped position. Fig. 14 is a fragmentary plan view of one of the troughing devices of this embodiment. Fig. 15 is a fragmentary side view of still another embodiment of my invention, showing cleats provided with movable members, and means for automatically actuating said members to trough the main belt. Fig. 16 is a fragmentary, sectional view of the embodiment shown in Fig. 15, one of the members being moved to a position for troughing the main belt, while Fig. 17 is a similar view, except said belt is in an untroughed position.

In the drawings, reference numeral 1 designates a main belt or carrying-surface, and 2 endless, traveling supporting means, constituting a belting or carrier; said supporting belting traveling with the main belt 1, and of necessity moving in timed relation thereto. Interposed between the main belt 1 and the traveling supporting means 2, are transverse troughing devices 3.

4, 4, designate grooved pulleys, constituting revoluble end-supports, around which the endless supporting means 2 are adapted to pass; said pulleys 4, 4, are preferably fixedly secured to shafts 6, 6, which are mounted upon any suitable frame work. The pulleys 4, 4 may be journaled upon said shafts if desirable. The pulleys 4, 4, or member 39 may be actuated by any suitable driving means for imparting movement to the belts of the conveyer.

In Fig. 3, the troughing device 3 comprises parallel bars or members 5, which are provided with integral, upward extensions 7 at each end, and integral, downward extending projections 8 secured to the endless supporting means 2. Bolts or rivets 9 pass through the extensions 7, on the bars 5, and through the downward extensions 10 of wings 11, thereby providing an axis or pivot point for said wings. Apertures 12 are formed upon the wings 11 for receiving rivets, bolts, or any suitable means, as at 13, to secure the said wings to the main belt 1. The extension 10 of the wings 11, are bifurcated, and a bolt 15 is passed through the bifurcated parts of the wings 11 and through the ends of toggle bars 14, which are fitted into these bifurcations. Suitable transverse securing means, as bolts 15, are passed through the rigid bars or members 5 for retaining the toggle bar 14 in position. Where the toggle bars come in contact with the belt 1, I preferably secure reinforcing means, as strips 16', of leather, sheet metal, or any suitable means, to take the wear off of said belt or carrying-surface 1. It is to be noted that the wings 11 constitute troughing members or levers, said wings being arranged at each side of the belt in line longitudinally of the belt, and each line of said wings being arranged parallel to the other.

In Fig. 5, additional wings 16, constructed similarly to wings 11, are assembled with the other parts of the transversely-arranged troughing devices 3; said wings or members 11 being bifurcated, in which bifurcations toggle bars 17 are mounted. The inner ends of the toggle bars 17 are secured by bolts 18, or like means, to said wings 11, and the outer ends of said bars being secured by bolts 10 in the bifurcation of the additional wings. In this construction, if any material is placed upon the edge of the belt, such material will cause a slight curvature of said edges by actuating the additional toggle bars 17, and said wings 16, and as the load carried by the belt is forced toward the center of said belt, or the weight increases, the main toggle bar 14 and the main wing or wings 11 will be actuated, and will, therefore, make a deeper trough or cup of said belt 1. It will be obvious that the position of the load upon the belt, or carrying-surface, governs the troughing or cupping capacity thereof, in this instance.

Referring particularly to the embodiment in Fig. 7, in which I have depicted the preferred structure of my two-belt conveyer, it will be seen that the main conveying-belt surrounds the endless supporting belt 20. The main conveying-belt is of ordinary flat form, (although the parts of its surface subjected to most wear may be thickened if desired) but it may be made of lighter and cheaper material than customary on account of the advantages arising from its use with the other elements of my improved structure. Arranged parallel with, and surrounded by the main belt 1, is a supporting belt or carrier 20 having secured thereto at suitable intervals transversely-positioned troughing devices, which are curved or troughed in a direction transverse of the belt. The two belts are driven in timed relation. The supporting belt is retained, at all times, in a flat position, and is not subject to transverse flexure. The main belt, which engages the troughing devices, is permitted to assume a uniformly troughed position during the conveying part of its travel, and is not subject to the wear and tear which takes place in those prior contrivances wherein the load carrying-belt flexed back and forth in its passage between and over the angularly disposed idlers. The main-belt or carrying-surface 1 is not directly carried by the supporting-belt 20, but is supported therefrom by means of troughing members, comprising transverse trough-shaped supports or cleats, which may be of shaped blocks of wood or bent up of metal. In either case, they are secured to and supported by the traveling supporting belt 20 and engage the main belt 1 to which they are preferaby secured. These trough-shaped members or supports comprise the main trough-shaped member 19 and auxiliary members 11ª and 16ª. The trough-shaped member 19 is provided with a flat base, which engages the supporting-belt 20, and permits said member to at all times lie flat upon the same. The movable troughing members or levers 11ª and 16ª comprise curved or trough-shaped supports, which are fulcrumed intermediate their ends. The trough-shaped members 11ª are fulcrumed to the primary trough-shaped member 19, at 23, and the troughing members 16ª to the outer end of the troughing members 11ª, as at 23ª. The ends of the trough-shaped, auxiliary members, which engage the main-belt 1, are preferably secured by means of plates 22 to said main belt 1. The troughing members carried by the primary trough-shaped members 19 are provided with lugs 25, which project laterally for engaging the ends 7 of the members 19 and the members 11ᵃ, for preventing of the auxiliary troughing members moving below the plane of the normally flat position of the main belt.

In the embodiment shown in Figs. 7ᵃ and 8ᵃ, instead of employing the normally flat, endless, supporting-belt 20, I employ endless supporting-means, as cables 2, to which the primary trough-shaped members 19 are secured by means of extensions 8. The endless supporting-means 2 constitute carriers, which are positioned within the limits of the edges of the main belt 1. Like the endless supporting-means 2, the flat supporting-belt 20 is positioned within the limits of the edges of the main belt or carrying-surface 1, and is, therefore, entirely surrounded by the same. The supporting-belt 20 and belting 2 are of less length than the main belt or carrying-surface.

Instead of using central or primary members 5, or trough-shaped members 19, I sometimes use channel-irons 26, or the like, as shown in Fig. 10. In this instance, the extensions 8 are formed integral with the channel-irons 26, and are adapted to secure the troughing devices 3 to the endless supporting-means, as cables or carriers 2. It is to be noted that the ends of the trough-shaped members, especially members 19, are slitted, notched, or bifurcated.

In the embodiment shown in Fig. 9, the troughing members or levers are arranged at each side of the carrying-surface 1, and are movable therewith, said members being secured to endless supporting means 2. Each set of troughing members or levers comprises two transversely alined trough-shaped supports, having long, inner arms 30 and shorter, outer arms 29, mounted transversely of the belt, and fulcrumed intermediate their ends, at 27, upon the supporting means 2, which constitutes a carrier, or an endless supporting-belt or belting. The troughing members at each side of the main belt or carrying-surface are arranged in line longitudinally of said belt. The ends of the trough-shaped members or levers are preferably secured, at 31, by means of plates 22, which are provided with extensions 28, to the main belt 1. The plates 22 are secured to the inner side of the carrying-surface 1, and form a pivotal connection between the ends of the troughing members, in this instance, and the main belt.

The type of two-belt conveyer depicted in Figs. 11 to 14 is similar to that shown in Figs. 7 and 8. In this embodiment, I employ a main belt or carrying-surface and an endless supporting-belt 20. The belts pass around ordinary cylindrical idlers or flat rollers 39, constituting end-supports. Suitable driving means may be attached to the idler or idlers 39, for imparting movement to the main and supporting belts. It is to be noted that the main belt, as well as the supporting-belt, pass around their end-supports in substantially a flat position. The main-belt is guided to a troughed or cupped position (at the end near the feed) by spool-rollers or idlers 38, and is supported in such position without the assistance of said idlers 38. The main-belt surrounds the supporting-belt and moves in timed relation thereto. Troughing means is carried by the supporting-belt 20, and is interposed between said belt 20 and the main-belt 1; the main-belt engages the troughing means. The troughing means comprises wings or members 11, which are provided with downward extensions 10. Bolts 9, or like means, pass through said extensions 10, and the blocks 32. The wings 11, and the blocks 32, are provided with apertures 12, through which pass bolts or rivets for securing said parts to the main and supporting belts 1 and 20, respectively. Apertured studs or guides 34, are secured to the supporting-belt 20, through which studs, rods 35 slide, being moved into the notches 33 in the extensions 10, when a load is placed upon the belt, by a plunger 36 secured to the under-side of the main-belt 1. In other words, when the belt 1 is depressed, the piston or plunger 36 (of each of the transverse troughing devices) is forced between the rods 35, 35 for causing said rods to be forced into contact with the extensions 10, of the wings 11, and as the edges of the belts are troughed through the medium of the idlers 38, the ends of the rods 35 engage the shallow notches 33 of extensions 10 of the wings, and hold the main-belt in a troughed position between the end-support 39 by means of the weight of the load upon said main-belt. In passing about the end-supports 39, the endless carrying-surface or main belt 1 must always be in a flat position, as seen in Fig. 11. If the main belt is troughed, as it approaches in its travel the end-support, there will be transverse strain upon said main belt 1 (as it must pass around the end-support in a flat position, Fig. 12), which will lift or draw outwardly the center of the main belt 1 sufficiently to withdraw plunger 36 and permit the parts to assume the relation seen in Fig. 12. Not only will the transverse strain on the main-belt 1, in passing around the end-support in its normal, flat position, cause the plunger 36 to be lifted or withdrawn from between the rods 35, but the springs 37 will also insure of the positive actuation of the plunger 36 as only a slight movement of said plunger will place the ends of the rods in engagement with the beveled end of the plunger and allow of the springs 37 to force the rods from engagement with the notches 33 of the wings 11. It is to be noted that, as notches 33 are very shallow, only a slight movement of the rods 35 is necessary to remove them from their seated position, Fig. 13.

In the embodiment depicted in Figs. 15 to 17, inclusive, the transverse bars or cleats 5 are fastened to the carrying-surface 1, and are secured by means of downward extensions 8, to the endless supporting means 2, as cables, constituting beltings or carriers. Formed integral with downward extensions 8 are lateral extensions 40, to which are secured, at 41, hinged or pivoted members, or wings or arms 42. The arms or wings have plates 43 formed integral therewith. The plates 43 are engaged by, and preferably secured to the carrying-surface or main-belt 1. The wings or arms 42 are provided with extensions or projections 44 upon which are journaled rollers 45. The rollers 45 are adapted to travel upon tracks 46, secured upon the frame carrying the grooved pulleys 4. The tracks are secured contiguous to the upper run of the carrying-surface. Each of the tracks 46 is provided with a bent or twisted end 47, and as the carrying-surface travels over an end-support and commences its upper run, the rollers 45 come in contact with the bent or twisted ends 47 (constituting guides) of the tracks 46, and pass upon the same, thereby pivoting the wings 42 upon their fulcrum or pivot points 40, for troughing the carrying-surface.

By the terms "cup" and "trough" which are used in this specification and claims, I mean a depression or channel formed in the carrying-surface or main-belt.

During the upper run of the carrying-surface, and especially when it is conveying a load, said carrying-surface is uniformly, longitudinally troughed, and as the load is discharged, the main-belt or carrying-surface flattens, for permitting of the same to pass around the end-support. The troughing means, as for instance, shown in Fig. 5, regulates the troughing or cupping capacity of the carrying-surface, by reason of the fact that if the load is only on the edge of the belt, said belt will be slightly troughed, but when the load is moved toward the longitudinal axis of the belt, or if the belt 1 is loaded from edge to edge, it will be accordingly troughed to a greater degree.

The troughing members or supports (especially those shown in Figs. 7 to 9) have their inner ends positioned within the limits of the edges of the main-belt, and preferably terminating short of the longitudinal axis of the belts.

In Fig. 7, I have shown a conveyer comprising two belts, one belt of less width than and positioned within the limits of the edges of the other, and means for preventing lateral displacement of a load supported and conveyed by said belts. It is to be noted that trough-shaped member 19, in Figs. 7 and 8, is provided with a horizontal flat base and an upper, flat incline or concaved surface or face.

What I claim is:—

1. An endless conveyer, comprising a normally flat belt, and means carried thereby for drawing the belt into a cupped or troughed position, when the belt is centrally depressed.

2. A conveyer, comprising a normally flat carrying-surface, and means carried thereby for moving said surface to a troughed position between supports, when under the weight of the load.

3. A conveyer, comprising a normally flat belt, and means carried thereby for moving the edges of the belt to a raised position when the belt is loaded.

4. A conveyer, comprising a normally flat traveling-belt, and means carried thereby for directing said belt to a load retaining position, during a portion only of its travel.

5. The combination with a belt, of means carried by the belt and actuated by a load for cupping or troughing said belt.

6. The combination with a belt, of traveling means extending transversely of the belt and actuated by a load for holding said belt in a cupped or troughed position.

7. The combination with a belt, of transverse means carried entirely by the belt and actuated by a load to hold the belt in a cupped position and automatically actuated when the load is removed to uncup the belt.

8. The combination of a belt having side wings, and means connected with the central portion of the belt and with the side wings and actuated by a load to cup the belt.

9. In a conveyer, the combination with an endless belt, and revoluble supporting means at each end of the conveyer around which the belt passes, of means holding the belt in a cupped position between the revoluble supporting means independent of any outside support and permitting the belt to uncup as it passes around an end revoluble supporting means.

10. A conveyer, comprising a belt, and mechanism carried entirely upon the inner face thereof for moving the belt into a troughed position.

11. A conveyer, comprising a belt, revoluble supports for said belt, traveling engaging means positioned within the edges of the belt and engaging said supports, and means interposed between the belt and engaging means and being capable of cupping or troughing the belt under a load.

12. A conveyer, comprising traveling supporting-means, and means carried by said supporting-means and operable by the load for retaining said load.

13. The combination with a belt, of levers fulcrumed intermediate their ends and secured to the belt, said levers only actuated by a load upon the belt to trough said belt.

14. The combination with a belt, of levers fulcrumed intermediate their ends and disposed transversely to the belt, said levers only actuated by a load upon the belt to trough said belt.

15. The combination with a belt, of levers fulcrumed intermediate their ends disposed transversely of said belt and secured to the same, said levers only actuated by a load upon the belt to trough said belt.

16. The combination with a belt, of upwardly curved levers fulcrumed intermediate their ends and secured transversely to the belt, said levers only actuated by a load upon the belt to trough said belt.

17. The combination with a belt, of levers secured to the belt and supporting means to which said levers are fulcrumed intermediate their ends, said levers only actuated by a load upon the belt to trough said belt.

18. The combination with a belt, of a plurality of wings on each side thereof.

19. The combination with a conveyer belt, of means carried by the belt for moving it upwardly in a plurality of places upon each side thereof.

20. The combination, of a belt of the same thickness throughout its width, and means carried entirely by said belt for moving the same to a troughed condition.

21. The combination with a belt, of a plurality of transverse members carried by the belt and capable of drawing the belt into a cupped or troughed position.

22. In a conveyer, the combination with a belt having sides movable upwardly, of a cable or the like movable with and parallel to said belt, and members pivoted to said cable or the like and movable to cup the belt.

23. A normally flat belt, and means secured thereto for moving the carrying-surface of the belt to a troughed condition.

24. A conveyer, comprising traveling load-carrying means, and means carried transversely of and by said carrying means, operable by the weight of the load, for altering the contour of said carrying means for retaining the load.

25. A conveyer, comprising traveling load-carrying means of the same thickness throughout its width, and means carried thereby for altering the contour thereof for retaining the load.

26. A conveyer, comprising traveling load-carrying means, and means carried thereby, operable by the weight of the load for altering the contour thereof for retaining the load.

27. A conveyer, comprising traveling load-carrying means, and load actuated means carried thereby for altering the contour of said carrying means between the end supports, independent of auxiliary supporting-means, for retaining the load.

28. A conveyer, comprising a carrying-surface, wings on each side thereof operable by the weight of the load for retaining said load.

29. The combination of a carrying-surface, upwardly curved, pivoted levers secured in parallel position to said carrying-surface, and parallel supporting-means movable with the carrying-surface, and to which said levers are pivoted.

30. A conveyer, comprising a carrying-surface, and traveling means actuated by a load on said carrying-surface for moving the sides and central portion thereof into a troughed or cupped position.

31. A conveyer, comprising a carrying-surface provided with side wings, means engaging approximately the central portion of the carrying-surface and connected with said side wings, actuated by a load to cup or trough said carrying-surface.

32. A conveyer, comprising an endless carrying-surface, spaced rotary means around which the carrying-surface passes, means actuated by a load only on said carrying-surface between the rotary means for moving the sides and central portion thereof into a troughed or cupped position independent of any outside support.

33. The combination, of a belt, or the like, parallel supporting means movable with the belt, and upwardly curved, transverse levers secured to said belt and pivotally connected to said supporting means.

34. A conveyer, comprising a primary belt, a secondary belt, and movable members interposed between said belts and extending transversely of and substantially the entire width thereof for cupping or troughing the primary belt.

35. A conveyer, comprising a belt, pivoted members beneath said belt and traveling therewith, said pivoted members being adapted to swing toward the common center of the belt for troughing the same.

36. A conveyer, comprising a carrying-surface, and means traveling therewith for moving said surface to a troughed condition.

37. A conveyer, comprising a carrying-surface, and means traveling therewith for moving said surface to a uniformly troughed condition.

38. A conveyer, comprising a carrying-surface, and means traveling therewith for moving said surface to a uniformly, longitudinally, troughed condition.

39. A conveyer, comprising a belt, and means traveling in timed relation thereto, for causing the edges of said belt to be moved to a raised condition, when the belt is loaded.

40. In a conveyer, the combination, with a belt, of pivotally mounted levers connected with said belt at various points transversely thereof in position for troughing said belt under the weight of a load, in varying degrees relative to the position of the load on the belt.

41. In a conveyer, the combination, with a movably mounted belt, of a belting moving therewith, and load actuated means carried by said belting for altering the normal contour of the carrying-surface of said belt.

42. A conveyer, comprising a normally flat belt, revoluble end supports around which the belt passes and traveling means for moving the belt to a troughed condition between said end supports when loaded.

43. A conveyer, comprising an endless carrying-surface, a belting within the limits of the two edges of said carrying-surface, and a troughing support arranged between said belting and carrying-surface.

44. A conveyer, comprising a belt, support-engaging means adapted to travel in timed relation thereto, and means interposed between the belt and support-engaging means for shaping said belt into a trough under the action of a load.

45. A conveyer, comprising a belt, and means adapted to travel in timed relation thereto and disposed beneath the carrying-surface of the belt for shaping said belt into a trough, under the action of a load.

46. In a conveyer, the combination of a belting, a belt spaced therefrom, and belt-cupping means arranged transversely of said belt and disposed between said belt and belting.

47. In a conveyer, the combination of a belting, a belt inclosing the same, and cupping means fixed to said belting transversely of said belt, and adapted to support the belt in a cupped condition.

48. In a conveyer, the combination of a belting, a belt normally parallel to said belting, and means interposed between said belt and belting for supporting said belt in a troughed condition.

49. A conveyer, comprising a belt, and means carried thereby for permitting troughing of said belt only under the action of a load.

50. A conveyer, comprising a carrying-surface, and means arranged transversely thereof and carried thereby for effecting a transverse bending of said carrying-surface, said means permitting said surface to assume a flat condition.

51. In a conveyer, the combination with a belt having sides movable upward, of a belting movable with and parallel to said belt, and means carried by the belting for moving the sides of the belt into a cupped or troughed position.

52. A conveyer, comprising a belt, and means traveling with said belt for troughing the same under the action of a load, and permitting the same to flatten transversely, when the load is removed.

53. A conveyer, comprising a belt, and means arranged transversely with respect to the belt, and traveling therewith for permitting the same to trough uniformly, longitudinally, and for permitting the belt to assume a flat condition, during part of its travel.

54. A conveyer, comprising a carrying-surface, and means traveling therewith and capable of supporting said carrying-surface in a load retaining position and permitting of the surface to flatten at its discharge point.

55. A conveyer, comprising a substantially flat carrying-surface, and means traveling therewith for directing said surface to a troughed condition.

56. In a conveyer, the combination, with a movably mounted belt, of belting moving therewith, and means carried by said belting for supporting the carrying-surface of said belt when troughed.

57. In a conveyer, the combination, with a main belt, of a belting inclosed by said main belt, troughing members secured to said belting and extending transversely of said main belt, said troughing members adapted to support the main belt in a troughed condition during its travel between the end supports and permitting of said main belt to pass around its end supports in a flat condition, the main belt, troughing-members, and belting moving in timed relation.

58. In a conveyer, the combination of a main conveyer-belt, of a supporting belting spaced therefrom, a plurality of troughing-members extending transversely of the main-belt and secured to said supporting belting throughout its entire length, the troughing-members permitting of the main-belt to assume a troughed or cupped condition, and permitting the same to pass around its end supports in a flat or untroughed condition, the main belt and supporting-belting being driven together in the same direction.

59. In apparatus of the character described, the combination of a main conveyer-belt, a supporting-belt extending parallel therewith and having supported thereon a plurality of transversely-arranged trough-shaped main-belt-supporting devices, and means for driving both the belts.

60. The combination with an endless support, of trough-shaped members movably carried thereby, a carrying-surface surrounding said support and adapted to be supported by said trough-shaped members, and means for moving said trough-shaped members and carrying-surface.

61. A conveyer, comprising an endless carrying-surface, and a support traveling with the upper run of the carrying-surface, said support being of a length less than that of the carrying-surface.

62. In a conveyer, the combination with revoluble supports, of two separate belts mounted upon said supports, said belts capable of supporting a load during a portion of their travel, one of said belts of less width than the other, and each belt adapted to pass around an end support in a flat position.

63. A conveyer, comprising an endless supporting-belt, an endless main-belt or carrying-surface surrounding said supporting-belt, main-belt troughing members carried by said supporting-belt and having their inner ends positioned within the limits of the edges of the main-belt.

64. A conveyer, comprising an endless supporting-belt, an endless main-belt surrounding said supporting-belt, transverse, main-belt, engaging members carried by said supporting-belt and having their inner ends terminating short of the longitudinal axis of the belts.

65. A conveyer, comprising a supporting-belt normally retained at all times in a flat position, a main-belt surrounding the supporting-belt, and means for supporting the main-belt in a longitudinally troughed position.

66. A two-belt conveyer, comprising a main conveyer-belt and a supporting belt, the main belt surrounding the supporting-belt, and troughing means for the main-belt.

67. A conveyer, comprising a traveling, flat supporting-surface, a traveling, carrying-surface positioned above said supporting-surface, and means for causing said carrying-surface to assume a position whereby lateral displacement of a load will be prevented.

68. A conveyer, comprising a flat, endless supporting-member, a carrying-surface of greater length than and positioned around said supporting-member, and means for causing the contour of said carrying-surface to be changed during its travel.

69. A conveyer, comprising traveling supporting means, transverse troughing members carried by said supporting means, each troughing member being provided with a flat base and an upper face inclined transversely with respect to said supporting means, and a carrying-surface positioned above said members and adapted to be supported thereby.

70. A conveyer, comprising a flat supporting belt, transverse troughing members carried by said belt, each troughing member being provided with a horizontal, flat base and an upper, flat face inclined transversely with respect to said supporting belt, and a main-belt surrounding said supporting belt and adapted to be sustained in a longitudinally troughed position during a part of its travel by said troughing members.

71. A conveyer, comprising endless supporting means, troughing members carried by said supporting means, each of said troughing members provided with a horizontal, flat base and an upper, concaved face, and a carrying-surface positioned above said members and adapted to be supported thereby.

72. A conveyer, comprising traveling supporting means, transverse troughing members carried by said supporting means, each troughing member being provided with a notched or bifurcated end and a flat base and an upper face inclined transversely with respect to said supporting means, and a carrying-surface positioned above said members and adapted to be supported thereby.

73. A conveyer, comprising endless supporting means, troughing members carried by said supporting means, each of said troughing members provided with notched or bifurcated ends and a horizontal, flat base and an upper concaved face, and a carrying-surface positioned above said members and adapted to be supported thereby.

74. A conveyer, comprising a normally flat carrying-surface, traveling supporting means arranged parallel with said carrying-surface, and members carried by said supporting means and interposed between the same and said carrying-surface, said members capable of movement transverse of said carrying-surface for moving the same to a troughed position.

75. In a conveyer, the combination with a carrying-surface, of means traveling bodily with said carrying-surface and actuated by a load for troughing said carrying-surface.

76. In a conveyer, the combination with supporting means and an endless traveling conveyer-belt, of troughing means for said conveyer-belt, said troughing means comprising a series of supports for opposite side-portions of said belt, said supports pivotally mounted upon said supporting means between their ends, and the supports adapted to rock freely on their pivots and automatically adjust themselves under the weight of the load carried by said belt, to shape the belt for conveyance of the load.

77. In a conveyer, the combination with supporting means and an endless conveyer-belt, of troughing means arranged in parallel lines upon said supporting means and adapted to engage opposite side-portions of the belt, said troughing means comprising rows of supports or members, each support pivoted intermediate its ends upon said supporting means, and said supports adapted to rock freely and adjust themselves under the weight of a load carried by the belt for shaping said belt for the conveyance of the load.

78. In a conveyer, the combination with a pair of supporting members, of belt-supports pivotally mounted near their center upon said supporting members, said belt-supports arranged in the same transverse plane, and a belt adapted to pass over said belt-supports and supported thereby.

79. In a conveyer, the combination with supporting means and a belt, of parallel rows of pivoted supports for opposite side-portions of said belt carried by said supporting means, and said supports adapted to rock upon said supporting means for raising their outer ends and lowering their inner ends under the action of a load carried by the belt for shaping the same for the conveyance of the load.

80. In a conveyer, the combination with supporting means and a belt, of a plurality of longitudinally-extending rows of pivotally-mounted belt supports, carried by said supporting means and supporting said belt, said belt supports being pivoted to one side of the longitudinal axis of the belt and adapted to automatically shape the belt under the action of a load carried by the same for the conveyance of said load.

81. In a conveyer, the combination with supporting members and a belt positioned contiguous to said members, of belt-supports pivotally mounted near their center upon said supporting-members, said belt-supports arranged transversely of the belt and adapted to rock upon said supporting member for raising their outer ends and lowering their inner ends under the action of a load carried by said belt for shaping the same for the conveyance of said load.

82. In a conveyer, the combination with supporting means and a belt positioned contiguous to said supporting-means, of belt-supports pivotally mounted intermediate their lengths upon said supporting means and arranged at opposite sides of the longitudinal axis of the belt, and said belt-supports arranged in rows contiguous to the side edges of the belt and being adapted to have their outer ends raised and their inner ends lowered under the action of a load upon the belt for shaping said belt for the conveyance of the load.

In testimony whereof I hereunto affix my signature, in the presence of two witnesses.

EDWIN E. VROOMAN.

Witnesses:
 NORRIS BOWEN,
 CASSELL SEVERANCE.